J. C. SMITH.
GATE VALVE.
APPLICATION FILED NOV. 3, 1919.

1,388,777.

Patented Aug. 23, 1921.

WITNESSES

INVENTOR
JAMES C. SMITH.
BY
ATTORNEYS

UNITED STATES PATENT OFFICE.

JAMES C. SMITH, OF PATERSON, NEW JERSEY, ASSIGNOR TO McNAB & HARLIN MFG. CO., OF NEW YORK, N. Y., A CORPORATION OF NEW YORK.

GATE-VALVE.

1,388,777. Specification of Letters Patent. Patented Aug. 23, 1921.

Application filed November 3, 1919. Serial No. 335,236.

*To all whom it may concern:*

Be it known that I, JAMES C. SMITH, a citizen of the United States, and a resident of Paterson, in the county of Passaic and State of New Jersey, have invented new and useful Improvements in Gate-Valves, of which the following is a full, clear, and exact description.

The invention relates to gate valves and particularly to outside screw and yoke gate valves using a yoke sleeve or bushing.

The object of the invention is to provide certain new and useful improvements in gate valves whereby the yoke sleeve or bushing can be readily removed, replaced or repaired without disturbing the yoke whether the latter is cast solid with the bonnet or cap or forms a separate part.

Another object is to permit of renewing or repairing the yoke sleeve or bushing while the valve is in position on the pipe line.

Another object is to simplify the construction of the yoke sleeve or bushing.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1:
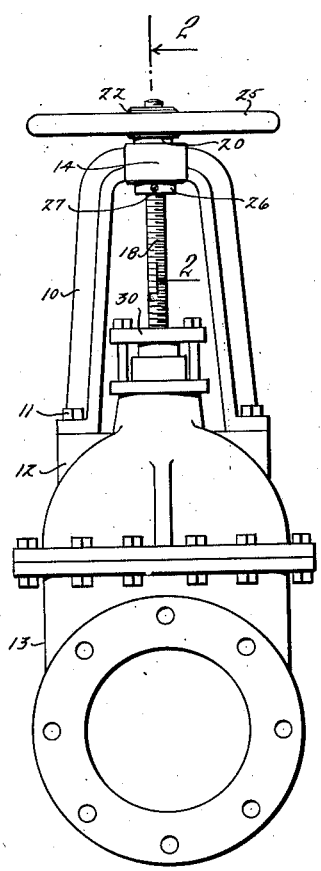
Figure 1 is an elevation of a gate valve provided with the improvements.

The yoke 10, as shown in Fig. 1, is fastened by bolts 11 to the bonnet 12 of the gate valve, but the yoke may be an integral part of the bonnet or cap. The hub 14 of the yoke 10 is provided with a bore 15 in which is mounted to turn the cylindrical portion 16 of a yoke sleeve or bushing 17, in which screws in the usual manner the threaded upper portion 18 of the stem of the valve. The yoke sleeve or bushing 17 is provided intermediate its ends with an integral collar 20 seated on the outer end of the hub 14, and on the outer portion 21 of the yoke sleeve or bushing 17 is secured the hub 22 of a hand wheel 23 or other suitable means for turning the yoke sleeve or bushing 17 with a view to move the valve stem and hence the valve inward or outward into closed or open position according to the direction in which the hand wheel 23 is turned at the time. The hub 22 of the hand wheel 23 is secured to the outer portion 21 of the yoke sleeve or bushing 17 by suitable fastening means such as a screw or one or more pins 24 each having a driving fit into an aperture formed partly in the wheel hub 22 and partly in the outer portion 21 of the yoke sleeve or bushing 17. By reference to Fig. 2 it will be noticed that the hub 22 of the hand wheel 23 is seated on the collar 20.

Figure 2:
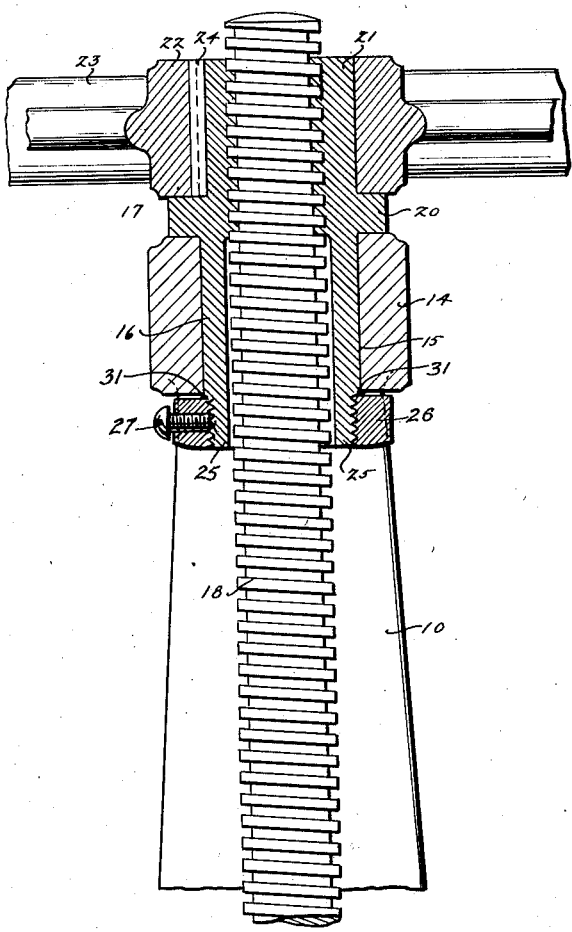
Fig. 2 is an enlarged sectional elevation of the same on the line 2—2 of Fig. 1.
Figure 3:
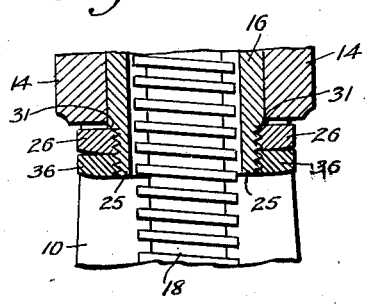
Fig. 3 is a sectional elevation of a modified form of the locking means for the retaining collar.

In order to hold the yoke sleeve or bushing 17 removably in position on the hub 14 of the yoke 10, the following arrangement is made: The inner end 25 of the cylindrical portion 16 of the yoke sleeve or bushing 17 is slightly reduced and projects beyond the inner end of the yoke hub 14 and this projecting end 25 is provided with an external screw thread on which screws a threaded collar or nut 26 abutting against a shoulder 31 formed by the reduced end 25 on the cylindrical portion 16 of the yoke sleeve. The shoulder 31 is adjacent the inner end of the yoke hub 14 and hence the collar or nut 26 holds the bushing 17 against displacement in the yoke hub 14, at the same time allowing convenient turning of the yoke sleeve or bushing 17 to move the valve into open or closed position. It will be noticed that by the arrangement described, the outer and inner ends of the yoke hub 14 extend between the collars 20 and 26 and hence the yoke sleeve or bushing 17 is held against movement lengthwise of its axis, not exceeding a proper working clearance between these parts. The collar 26 is normally locked against accidental unscrewing by suitable locking means such, for instance, as a set screw 27, as shown in Fig. 2, or a lock nut 36, as illustrated in Fig. 3.

When it is desired to replace or repair a yoke sleeve or bushing 17, the operator retracts the set screw 27 or removes the nut 36, and then unscrews the collar or nut 26 from the inner end 25 of the yoke sleeve or bushing 17. The latter can now be unscrewed on the outer end of the threaded portion 18 of the valve stem without disturbing the yoke, stem or other internal parts of the valve. A new or repaired yoke sleeve or bushing is next screwed on the outer end of the threaded portion 18 of the valve stem until the cylindrical portion 16 is in engagement with the bore 15 and the collar 20 is seated on the outer end of the hub 14, and then the operator screws the collar 26 on the projecting inner end 25 of the cylindrical portion 16 until the collar 26 abuts against the shoulder 31. The set screw 27 or the lock nut 36 is then screwed up to fasten the collar 26 in place. It will be noticed that when the collar 26 is unscrewed from the inner reduced end 25 of the cylindrical portion 16 of the yoke sleeve or bushing 17, it is allowed to rest temporarily on the gland 30, that is, until the yoke sleeve is replaced by a new or repaired one; after which the collar 26 is secured on the inner end 25, as above explained.

From the foregoing it will be seen that a worn out or otherwise defective yoke sleeve or bushing can be readily replaced or repaired without disturbing either the yoke, stem or other internal parts.

Having thus described my invention, I claim as new and desire to secure by Letters Patent:—

1. In a gate valve, a yoke having a hub, a yoke sleeve mounted to turn in said yoke hub and in which moves the valve stem, the said yoke sleeve having an integral collar seated on the outer end of the said yoke hub, and removable retaining means engaging the said yoke sleeve to hold it against axial displacement in the hub, the said retaining means when removed allowing removal of the yoke sleeve from the hub and from the valve stem without disturbing the position of either the yoke, stem or other internal valve parts when the valve is in its closed position.

2. In a gate valve, a yoke having a hub, a yoke sleeve removably fitting into the said yoke hub and having an integral collar resting on the outer end of the said yoke, the sleeve having an externally threaded reduced inner end extending beyond the inner end of the said yoke hub and forming a shoulder with the sleeve, and a threaded member screwing on the said threaded inner end of the sleeve and abutting against the said shoulder adjacent the inner end of the yoke hub to allow a free operation of the valve without binding of the sleeve in the yoke hub.

JAMES C. SMITH.